United States Patent
Koenig et al.

(12) 
(10) Patent No.: US 6,351,452 B1
(45) Date of Patent: Feb. 26, 2002

(54) TELECOMMUNICATION DEVICE WITH CENTRALIZED PROCESSING, REDUNDANCY PROTECTION, AND ON-DEMAND INSERTION OF SIGNALING BITS

(75) Inventors: Roger L. Koenig; S. Christopher Alaimo, both of Boulder; Timothy Groth, Lakewood; Debra M. Rose, Superior; Shri B. Dodani, Louisville; Raviraj Edwards; Bharat S. Shah, both of Aurora; Kenneth M. Stevens; Matthew Morris, both of Boulder, all of CO (US)

(73) Assignee: Carrier Access Corporation, Boulder, CO (US)

( * ) Notice: Subject to any disclaimer, the term of this patent is extended or adjusted under 35 U.S.C. 154(b) by 0 days.

(21) Appl. No.: 09/233,007

(22) Filed: Jan. 19, 1999

(51) Int. Cl.[7] .............................................. H04L 12/28
(52) U.S. Cl. ...................................... 370/217; 370/537
(58) Field of Search ................................ 370/216, 217, 370/219, 220, 225, 226, 228, 522, 537, 538, 419, 420

(56) References Cited

U.S. PATENT DOCUMENTS 5,533,018 A * 7/1996 DeJager et al. ............. 370/352
6,181,694 B1 * 1/2001 Pickett ....................... 370/353

* cited by examiner

Primary Examiner—Chau Nguyen
Assistant Examiner—Alexander O. Boakye
(74) Attorney, Agent, or Firm—Holland & Hart (57) ABSTRACT

A telecommunication device for receiving and transmitting DS1 level signals that includes a 1/0 digital cross-connect switch, a GR-303 concentrator, and a frame relay aggregator switch in a single integrated device in one housing that fills less than two standard rack units. The device includes both active and standby/backup controller cards that communicate with eight quad framer cards through a bus located in the backplane. The communication through the backplane is via a 8.192 Mbps signal to and from each quad framer card, passed along a bus. The 8.192 Mbps signal is generated by multiplexing the four DS1 (E-1) signals on the quad framer card. The controller card that is active monitors the status of the DS1 channel associated with each framer and stores historical data about the status in spare buffer registers on each framer. Whenever a transition occurs to the standby/backup controller card, that card can obtain the historical status information from the framers to make the transition more seamless. The device also includes software that is interrupted on signaling bit changes, so that a software program can control a digital cross-connect of the signaling bits, and translation if necessary.

16 Claims, 9 Drawing Sheets

TELECOMMUNICATION DEVICE WITH CENTRALIZED PROCESSING, REDUNDANCY PROTECTION, AND ON-DEMAND INSERTION OF SIGNALING BITS

The present invention relates to a telecommunication device for use in interfacing central telephone networks to on-site customer equipment and in particular, the present invention relates to such telecommunication devices that have a more efficient architecture, provide for more efficient switching between redundant components, and provide for on-demand insertion of signaling bits.

BACKGROUND OF THE INVENTION

The modern world of telecommunication includes new equipment, standards, and applications being introduced at a rapid rate. In particular, the required speed and efficiency of telecommunication networks is increasing. One important area of telecommunication networks relates to the interface between a telephone company's central office (CO) and on-site equipment located at the customer premises.

Historically, the CO and the customer equipment had been connected by dedicated lines carrying analog signals. More recently, channels carrying time division multiplexed (TDM) signals have been carried on T-1 lines. The data carried on these T-1 lines is referred to as DS1 data which includes 24 DS0 channels, where each DS0 channel may carry a single telephone conversation. A DS0 channel operates at 64 kilobytes per second, or 8,000 8 byte samples per second.

The equipment used at the CO may be a Class 5 switch, a type of digital CO switch typically used in "end office" applications, serving local voice traffic subscribers. The Class 5 switch may have many T-1 links to various equipment at various customer sites. As stated before, each of these T-1 links can carry up to 24 DS0 voice channels. Of course, it is a waste of resources for the Class 5 switch to have dedicated T-1 lines to the various customer equipment, since all of the customer equipment will likely not be fully utilized at any given time. Accordingly, it is known in the industry to concentrate telephone conversations from a plurality of analog lines (to a set of T-1 lines that have fewer DS0s than the number of analog lines) with a digital loop carrier (DLC) utilizing a standard for concentrating such as Bellcore™ GR-303-CORE, IDLC Generic Requirements, Objectives, and Interface: Requirements Supporting Interfacing to the Digital Network, the contents of which are incorporated herein by reference. Also, it is known in the industry to multiplex 24 analog telephone lines into a single T-1 line at a customer premise, and to concentrate sets of T-1 lines into fewer T-1 lines in accordance with GR-303-CORE, also known as a GR303 concentrator. Such a DLC operating as a 303 concentrator may be inserted into the network between the Class 5 switch and the customer equipment that multiplexes analog telephone lines into T-1 lines.

In addition, it is known to provide cross-connect switching at the same point as the 303 concentrator, downstream of the CO switch. 1/0 digital cross-connects switches (DCS) switch DS0 channels within the same or various T-1 communication links. Hardware switches performing 1/0 DCS are known, such as Mitel's MT90820. In addition, it is known to provide a frame relay aggregation switch in the same point as the 303 concentrator and DCS, downstream of a CO frame relay switch. A frame relay switch provides frame relay services, wherein frames are packets of data that can be anywhere between 0 and 4,096 octets long. Each frame is preceded by a flag and address field and is followed by a frame check sequence and flag. Frame relay services are a desirable way to pass digitized data along a telecommunications network, particularly data that comes in bursts.

In the prior art, it has only been known to provide a 303 concentrator, a 1/0 DCS, and a frame relay switch in three separate boxes or components. Unfortunately, such an approach has been expensive, taken up an undesirably large volume of space, caused undesirable transmission delays affecting the quality of the transmission, and caused management of the various network elements to be very difficult. In addition, it has been the approach of most prior art devices to provide for connection to many different interfaces, or in other words to solve many different problems fairly well rather than one specific problem very well.

Some of the other drawbacks of employing such antiquated and segmented approaches to voice and data services include: (1) the traditional network deployment was not designed to support the ever-growing demand for voice and data services; (2) with traditional system components, many diverse pieces of equipment are required to route information from the customer site to the carrier voice and data network resources; (3) with diverse equipment, setting up and maintaining quality voice and data service to customers requires a large number of skilled technicians; (4) traditional systems also often require bandwidth and switching resources which are dedicated to a particular customer, this results in a significant amount of unused infrastructure during the high percentage of inactive times; (5) with a number of different types of equipment in the path, transmission delays and quality of service can become problems in providing voice and data services; and (6) new protocols are evolving to better utilize transport and switching bandwidths, but legacy, or currently-installed, equipment architectures do not effectively support these new capabilities.

Also, the reliability of telephone network equipment is an important issue. Because of the importance of reliability, it is known to supply redundancy (the use of spare or redundant components) in various types of telecommunication equipment. Spare circuits or cards can be automatically switched into replace active circuits or cards, in the case of certain types of faults which may be detected. It is important for the transition between active circuits and standby circuits to be as seamless as possible, particularly where the circuit may have been in the middle of a critical operation. Unfortunately, when redundant equipment is switched in to replace an active piece of equipment, data about the status and history of other components may be lost.

Many redundant systems have a complex switch-over mechanism. In order to finish a critical operation that was started by a failed primary or active circuit, a backup circuit must be well informed of the status when the backup circuit takes over. For instance, the backup circuit must be informed that the active circuit has started a particular critical operation. Also, if the critical operation requires a sequence of actions, the backup circuit must know which actions were completed before the fault occurred, and which actions were not yet completed. Only in this manner, can the backup equipment finish the not yet completed actions.

Another issue that is particular to digital cross-connect switches is the loss of signaling bits. Signaling bits are associated with frames of T-1 data to provide various types of signaling including ringing, dial tone, hang-up, and so forth. On T-1 communication links, voice circuits include signaling bits imbedded into each frame of data, typically the least significant bit every six frames of data. These frame bits can be recognized by the equipment at each end of a T-1 communication link. Unfortunately, a 1/0 DCS loses the signaling bits as part of its cross-connect switching. In this case, such DCS circuits require the signaling bits to be reinserted into the sixth, twelfth, eighteenth, and twenty-fourth frames of data on T-1 communication links. In the past, this has been done with signaling bit cross-connect hardware. Further, there is not believed to be any approach that provides for signaling bit translation to convert between different protocols and interfaces.

It is against this background, and the desire to solve the problems of and improve on the prior art, that the above invention has been developed.

SUMMARY OF THE INVENTION

The present invention is directed to a telecommunication device for interconnecting multiplexed high speed voice and data channels, each multiplexed DS1 high speed voice and data channel carrying a serial stream of digital data bits and having sufficient capacity to carry multiple DS0 voice and data channels. The telecommunication device includes: (1) a backplane receptive of each of the multiplexed DS1 high speed voice and data channels; (2) a plurality of framer cards connected to the backplane, each framer card being receptive of N of the multiplexed DS1 high speed voice and data channels, each framer card segmenting the serial stream of digital data bits into frames of data and multiplexing the N DS1 channels to a rate of at least N times DS1, with this multiplexed signal provided as an output from the framer cards; (3) a primary controller card connected to the backplane and receptive of the frames of data from each of the framer cards in the multiplexed signal, the controller card performing a time slot interchange on various ones of the DS0 channels in the multiplexed DS1 high speed voice and data channels; and (4) a redundant controller card connected to the backplane and receptive of the frames of data from each of the framer cards in the multiplexed signal, the controller card performing a time slot interchange on various ones of the DS0 channels in the multiplexed DS1 high speed voice and data channels. Each of the controller cards include logic therein to determine which of the primary and redundant controller cards are active to perform the time slot interchange and which of the controller cards are in standby.

The active one of the primary and redundant controller cards may also perform a concentration of the DS0 channels into DS1 channels. The concentration may be performed according to GR-303 protocol. Each of the plurality of framer cards may include four framers, one for each of the four DS1 channels to which each framer card is receptive. The framer cards multiplexed signal output therefrom may be at a rate of at least 8.192 Mbps.

The active one of the primary and redundant controller cards may monitor the status of the DS1 channel associated with each framer and generate historical data about the status of the DS1 channel and store the historical data in spare registers within the corresponding framer, and wherein upon a transition between the two controllers, the controller that has just become active can read the historical data from each framer to understand the status of the DS1 channel associated with each framer.

The active controller card may include a processor thereon with software that performs a digital cross-connect of signaling bits in the DS0 channels. The software in the processor may only perform the digital cross-connect of signaling bits on every change in the respective signaling bit. The processor may also translate signaling bits to different signaling types.

The present invention is also directed to a telecommunication device including a housing having outer dimensions configured to fit in a standard telecommunication bay and consuming no more than two rack units. The device also includes: (1) a 1/0 digital cross-connect switch located within the housing and utilizing a controller having at least one processor thereon; (2) a concentrator operating per the Bellcore GR-303 standard located within the housing utilizing the controller and the at least one processor; and (3) a frame relay aggregation switch located within the housing utilizing the controller and the at least one processor.

The present invention also relates to a telecommunication device for interconnecting multiplexed high speed voice and data channels, each multiplexed DS1 high speed voice and data channel carrying a serial stream of digital data bits and having sufficient capacity to carry multiple DS0 voice and data channels. The telecommunication device includes: (1) a backplane receptive of each of the multiplexed DS1 high speed voice and data channels; (2) a plurality of framer cards connected to the backplane, each framer card being receptive of a plurality of the multiplexed DS1 high speed voice and data channels, each framer card segmenting the serial stream of digital data bits into frames of data; (3) a primary controller card connected to the backplane and receptive of the frames of data from each of the framer cards, the controller card performing a time slot interchange on various ones of the DS0 channels in the multiplexed DS1 high speed voice and data channels; and (4) a redundant controller card connected to the backplane and receptive of the frames of data from each of the framer cards, the controller card performing a time slot interchange on various ones of the DS0 channels in the multiplexed DS1 high speed voice and data channels. Each of the controller cards include logic therein to determine which of the primary and redundant controller cards are active to perform the time slot interchange and which of the controller cards are in standby. The active one of the primary and redundant controller cards monitor the status of the DS1 channel associated with each framer and generate historical data about the status of the DS1 channel and store the historical data in spare registers within the corresponding framer. Upon a transition between the two controllers, the controller that has just become active can read the historical data from each framer to understand the status of the DS1 channel associated with each framer.

The present invention also relates to a telecommunication device for interconnecting multiplexed high speed voice and data channels, each multiplexed DS1 high speed voice and data channel carrying a serial stream of digital data bits and having sufficient capacity to carry multiple DS0 voice and data channels. The telecommunication device includes: (1) a backplane receptive of each of the multiplexed DS1 high speed voice and data channels; (2) a plurality of framer cards connected to the backplane, each framer card being receptive of a plurality of the multiplexed DS1 high speed voice and data channels, each framer card segmenting the serial stream of digital data bits into frames of data; (3) a primary controller card connected to the backplane and receptive of the frames of data from each of the framer cards, the controller card performing a time slot interchange on various ones of the DS0 channels in the multiplexed DS1 high speed voice and data channels; and (4) a redundant controller card connected to the backplane and receptive of the frames of data from each of the framer cards, the controller card performing a time slot interchange on various ones of the DS0 channels in the multiplexed DS1 high speed voice and data channels. Each of the controller cards include logic therein to determine which of the primary and redundant controller cards are active to perform the time slot interchange and which of the controller cards are in standby. The active controller card includes a processor thereon with software that performs a digital cross-connect of signaling bits in the DS0 channels only upon receiving an interrupt signal indicating that the respective signaling bits have changed.

The present invention also relates to a method for passing data within a telecommunication device from a primary circuit initially controlling the device to a redundant circuit that can assume control of the device and become active upon the removal or failure of the primary circuit, the device having a plurality of input circuits receptive of a plurality of input signals. The method includes: generating data in the primary circuit about the input circuits and the input signals; passing the data about the input circuits and input signals from the primary circuit to the respective input circuits; determining that the redundant circuit is to assume control of the device; transitioning control of the device to the redundant and newly-active circuit; and passing the data about the input circuits and input signals from the respective input circuits to the redundant and newly-active circuit.

The present invention also relates to a method of restoring signaling bits in a digital cross-connect switch for cross-connecting DS0 channels in a multiplexed DS1 channel. The method includes: detecting a change in a signaling bit in an incoming DS0 channel embedded in the incoming DS1 channel, the at least one signaling bit changing to a new value; sending an interrupt signal based on the detection; reading the new value of the at least one signaling bit; reading from a cross-connect table to determine a new outgoing DS0 channel to place the at least one signaling bit into; and writing the at least one signaling bit into the new outgoing DS0 channel.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

Figure 1:
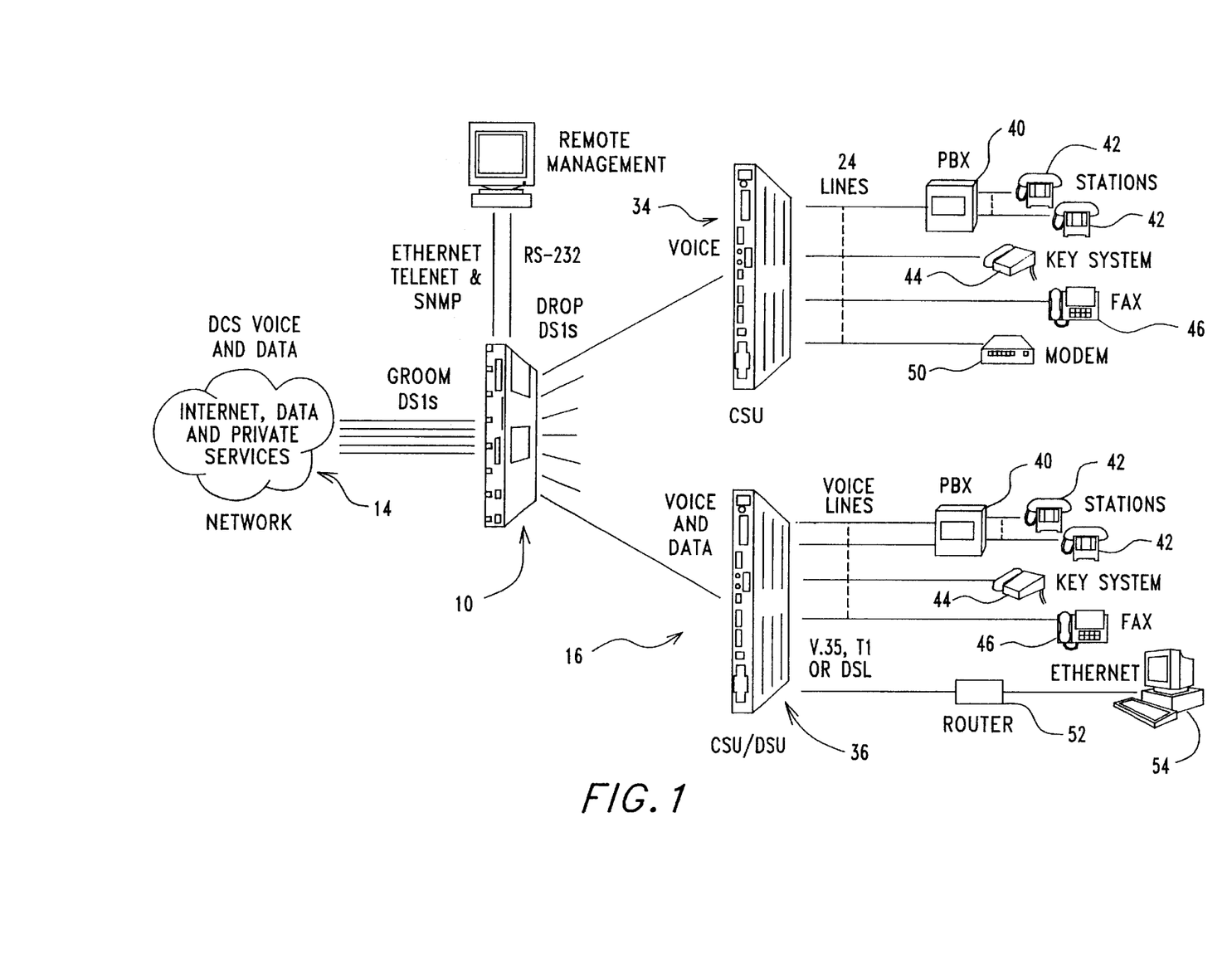
FIG. 1 is a block diagram of a typical application of the telecommunication device of the present invention, being used as a DCS or data host.
Figure 3:
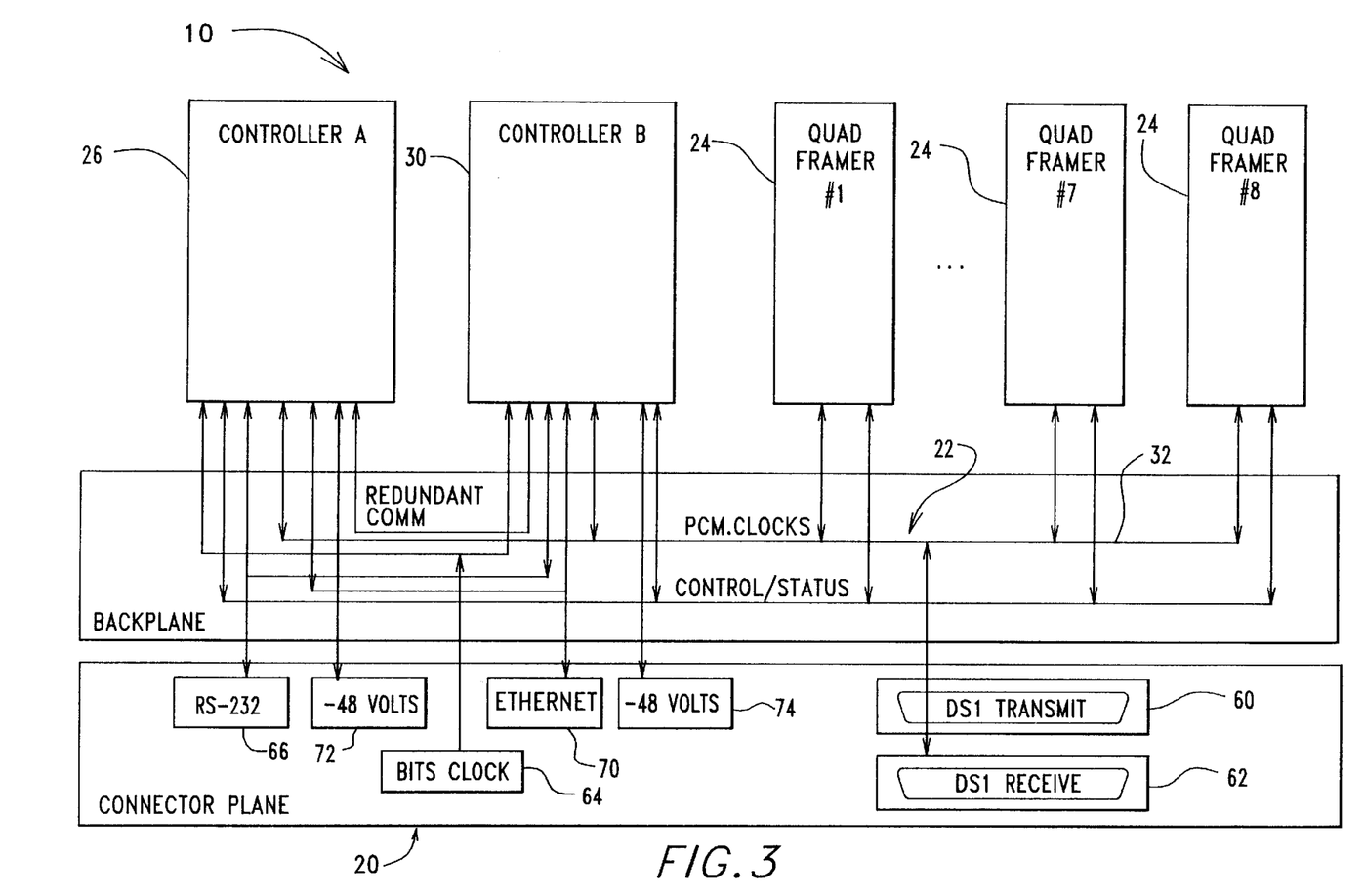
FIG. 3 is a block diagram showing the internal architecture of the telecommunication device of the present invention.

A telecommunication device 10 of the present invention may be inserted into a telecommunications system as shown in FIG. 1, between a central office switch 12 or other components of a telephone network 14 and customer equipment 16. The telecommunication device 10, as shown in FIG. 3, includes a connector plane 20 for the connection of the external T-1 lines, other external communication, and electrical power to the device 10. The device 10 also includes a backplane 22 in electrical communication with the connector plane 20, for distributing electrical signals and power to the various components of the device 10. Eight quad framer cards 24 are connected to the backplane 22. These quad framer cards 24 receive DS1 data from T-1 lines and frame up the data in a generally conventional manner. Also attached to the backplane 22 are a pair of controller cards 26 and 30. The controller cards 26 and 30 communicate with the quad framer cards 24 through a bus 32 in the backplane 22. The four DS1 channels from each quad framer card 24 are multiplexed together on the card 24 to a rate of 8.192 Mbps (four times the E-1 rate) for distribution on the bus 32 to the controller cards 26 and 30. The two controller cards 26 and 30 are redundant copies of each other, with controller card A 26 being the primary or active card and controller card B 30 being the secondary or backup card.

The telecommunication device 10 is configurable as a DCS that combines the functions of a 32-port T-1 digital cross-connect system, a T-1 channel/data service unit (CSU/DSU), T-1 diagnostic tests equipment, and a host controller for other CSU/DSU units connected thereto. The device 10 is housed in a modular chassis 17 inches wide, 13.5 inches deep, and 2.75 inches tall so that it is less than two standard telecommunication rack units high. The device 10 also provides interconnection with ethernet SNMP and modular T-1 expansion.

The telecommunication device 10 provides all the grooming and filling functions of a 1/0 digital cross-connect system to maximize T-1 usage. With carrier/customer demarcation testing, carriers are able to decrease maintenance costs and labor, while increasing service availability. Fractional voice and data services from multiple customers and applications are combined by the telecommunication device 10 to save both recurring transmission costs, and capital costs on switch or router ports.

As shown in FIG. 1, the telecommunication device 10 may connect with a channel service unit (CSU) 34, in the case of voice only applications, or a channel/data service unit (CS.U/DSU) 36 in the case of voice and data applications. Alternatively and preferably, the CSU 34 and the CSU/DSU 36 could be replaced with a system such as is disclosed in U.S. patent application Ser. No. 08/760,103, filed Dec. 3, 1996, now U.S. Pat. No. 6,101,198, and entitled "Processor-Based Voice and Data Time Slot Interchange System" (and known as the Carrier Access Corporation® Access Bank® II), which is incorporated herein by reference. The CSU 34 may convert between 24 DS0 channels and a drop DS1 channel, where the 24 DS0 channels can include a PBX 40 with multiple handsets 42, a key system 44, a fax 46, and/or a modem 50, or any other suitable piece of telecommunications equipment. The CSU/DSU 36 converts between 24 DS0 voice and data channels and one DS1 channel. The 24 voice and data channels may connect to a PBX 40 servicing multiple handsets 42, a key system 44, a fax 46, and/or a V.35, fractional T-1, or DSL line through a router 52 to an ethernet 54.

Additional quad DS1 cards 24 can be installed while the device 10 is in service to provide from 4 to 32 DS1/CSU connection ports. Flash memory permits software updates to redundant systems without affecting service. Management access to the device 10 is provided via ethernet SNMP, Telnet/CLI, and RS-232/CLI. Flow-through provisioning and testing control over T-1 connections from the device 10 to the CSU 34, and/or the CSU/DSU 36, reduces truck rolls and monitors voice data service availability at customer locations.

Figure 2:
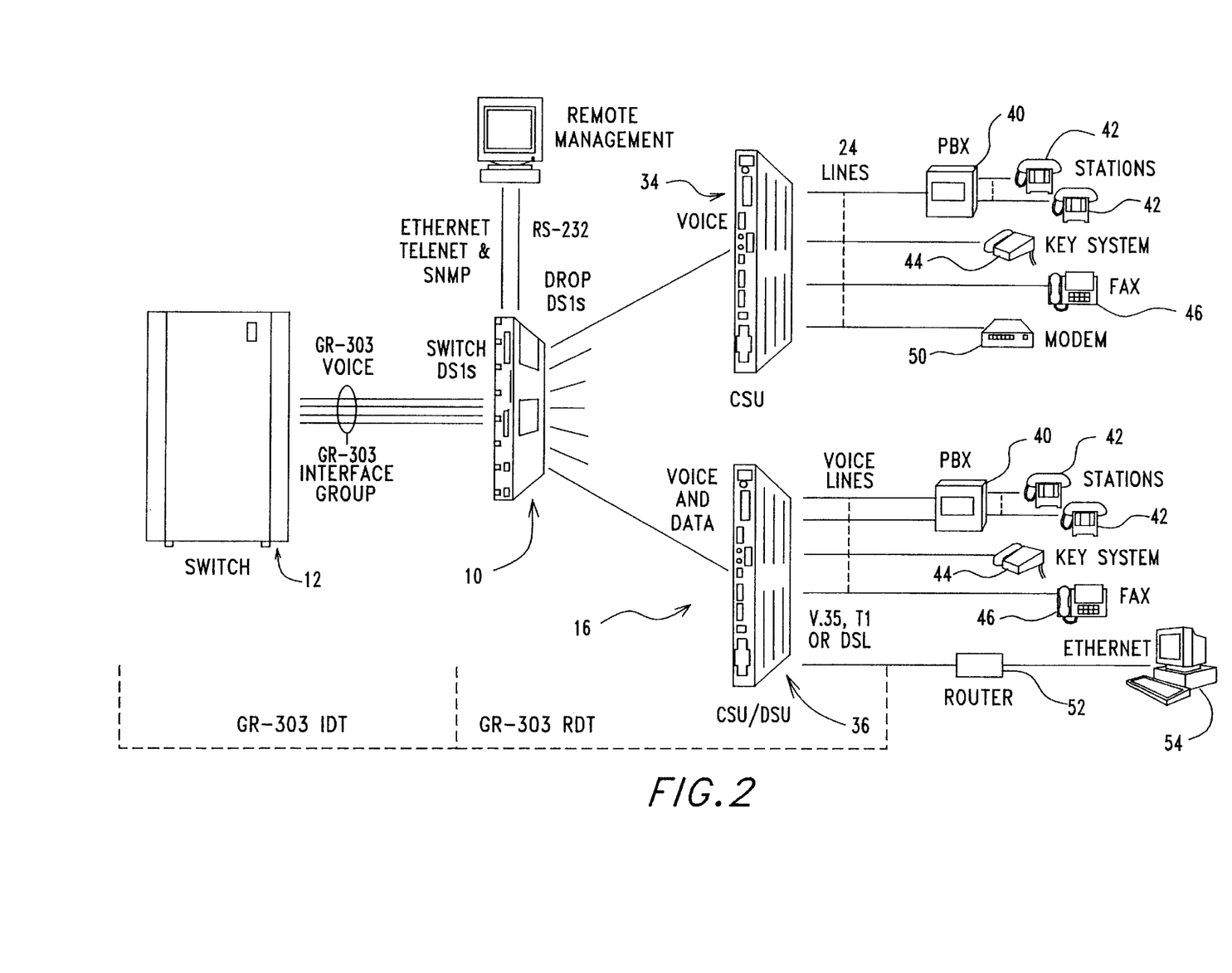
FIG. 2 is a block diagram of another typical application of the telecommunication device of the present invention, being used as a GR-303 concentrator.

Alternatively, the device 10 can be configured as a GR-303 concentrator, as shown in FIG. 2. Similar to FIG. 1, the device 10 acting as a 303 concentrator communicates with CSUs 34 and/or CSU/DSUs 36 via up to 30 DS1 channels. In addition, the device 10 can be remotely managed. The device 10, however, does concentrate the DS0 channels in the drop DS1s to a lesser number of switch DS1s that communicate through a GR-303 interface group to the switch 12. Using the Bellcore-standard GR-303 switching protocol, up to 720 customer telephone channels can be assigned on a call-by-call basis to classify local digital switch T-1 connections. In addition to the concentration and management, the device 10 grooms, and optionally concentrates, fractional T-1 data connections from customer locations. This call concentration can reduce recurring transmission costs and switch or router port costs up to a factor of 8.

The connector plane 20 of the device 10 includes two 64 pin connectors, a DS1 transmit connector 60 and a DS1 receive connector 62. The connector plane 20 also has an RJ-45C interface 64 for connection to an external clock source or a building integrated timing supply (BITS). The connector plane 20 also includes an RS-232 interface 66 for CLI management. The connector plane 20 also includes a 10Base-T connector 70 (ethernet) for SNMP and Telnet CLI management. The connector plane 20 also includes two connectors 72 and 74 for receiving –48 volt power.

Signals and power from each of these connectors 60, 62, 64, 66, 70, 72, and 74 are provided to the backplane 22 for connection to the bus 32 or directly to the quad framer cards 24 or controller cards 26 and 28.

The quad framer cards 24 (shown in FIG. 9): (1) convert 4 T-1 signals to 4 DS1 signals; (2) frame and reframe the DS1 signals; (3) monitor the T-1 signals; (4) extract and insert signaling bits for voice channels; (5) monitor performance of DS1 signals; and (6) provide loopback capability. Each quad framer card 24 includes four channelized T-1/E-1 line interfaces and protection circuitry. Each card employs four framers 80, such as a Brooktree BT-8370 integrated T1/E1 framer and line interface, to recover data and clocks from the line and to frame these signals for transport over the backplane 22. The backplane interface is multiplexed (all four PCM streams on a single wire) at 8.192 Mbps with a 16.384 MHz system clock using GCI type timing. The 1.544 MHz clock for the line interface is derived from the 16.384 MHz backplane clock by using the clock adapter circuit internal to the framer 80.

Figure 9:
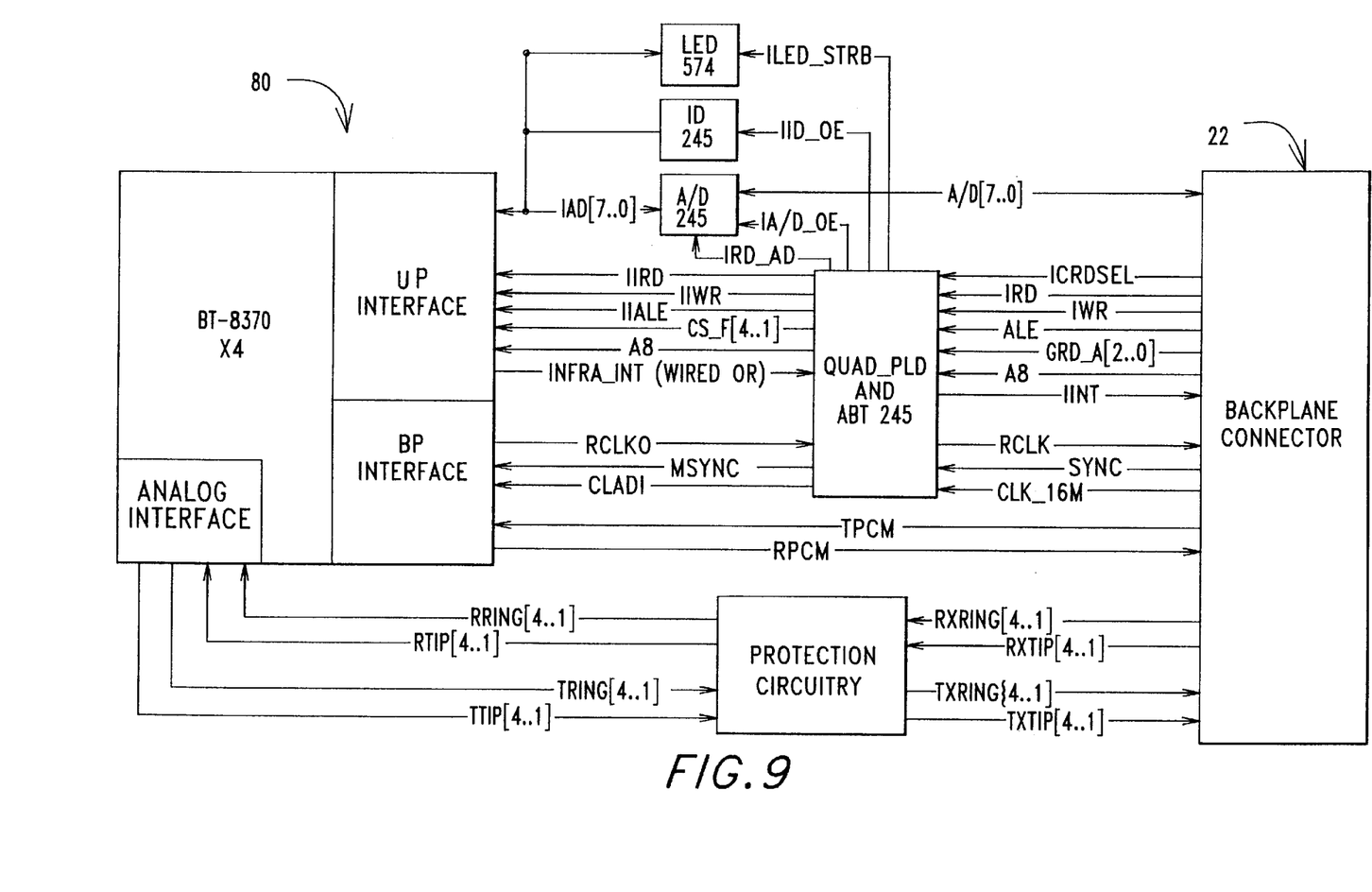
FIG. 9 is a block diagram of one of the quad framer cards of FIG. 3.

The interface to the quad card 24 includes a card present signal, microprocessor interface, synchronous data backplane interface, and an analog tip and ring interface. The card present signal indicates the presence or absence of a card 24 in the slot, the microprocessor interface provides host access to the registers onboard the card 24, the synchronous backplane interface handles the flow of PCM data to and from the main controller card 26 or 30, and the analog tip and ring interface provides the actual T-1 connection to the outside world.

| Symbol | Type | Pins | Description |
|---|---|---|---|
| !CRD_PRES | O | D11 | Grounds backplane trace to indicate the presence of a quad card. Backplane trace is pulled high on controller. |
| AD[7:0] | I/O | E3–8, E10–11 | Address/data signals for multiplexed Intel bus. |
| A8 | I | D5 | Address signal for multiplexed Intel bus. |
| !CRD_SEL | I | C10 | Card select line (active low). |
| !RD | I | D8 | Read strobe (active low). |
| !WR | I | D6 | Write strobe (active low). |
| ALE | I | D7 | Address Latch Enable. |
| CRD_A[2:0] | I | C8–6 | Separate address bus which is decoded by the quad pld to determine chip selects on the card. |
| !INT_BP | O | D10 | Driven interrupt signal derived from wired OR of the !INT pins on the framer chips (active low). |
| RCLK | O | D3 | Recovered 1.544 MHz clock selected from one of the framers. |
| CLK_16M | I | A3 | 16.384 MHz backplane clock which synchronizes entire system. |
| SYNC | I | D4 | Multi-frame sync signal which is one 16.384 MHz clock wide every 6ms. |
| RPCM | O | A5 | 8.192 MHz byte-interleaved RX PCM data from framers. TDM 4:1 of framers' RPCMO. |
| TPCM | I | A7 | 8.192 MHz byte-interleaved TX PCM data to framers. TDM 4:1 of framers' TPCMI. |
| RXTIP[4:1] | I | E18–15 | Receive analog tip input. |
| RXRING[4:1] | I | D18–15 | Receive analog ring input. |
| TXTIP[4:1] | O | B18–15 | Transmit analog tip output. |
| TXRING[4:1] | O | A18–15 | Transmit analog ring output. |
| NC | — | A–E13–14, C15–18 | No Connect. Provides buffering for high voltage section. |
| +5V_BP | PWR | A–E2 | Power input. |
| GND | PWR | A–E1, A4, A6, B–E9 | Ground. |
| FUTURE | — | — | All other pins available for future expansion. |

Microprocessor access to the registers on the quad card 24 is controlled by a nine bit bus (1 address, 8 address/data lines) using Intel style timing. For timing details, reference the BT-8370 data book. Chip selects and strobes for latches are generated from a three bit card address bus, CRD_A[2 . . . 0].

A. Quad Card Address Space

| 11 | 10 | 9 | 8 | 7 | 6 | 5 | 4 | 3 | 2 | 1 | 0 |
|---|---|---|---|---|---|---|---|---|---|---|---|
| CRD_A[2..0] | | | A8 | AD[7..0] | | | | | | | |

B. 0x000 — Card Identification (ID): Read only.

| 7 | 6 | 5 | 4 | 3 | 2 | 1 | 0 |
|---|---|---|---|---|---|---|---|
| TYPE[3..0] | | | | REVISION[3..0] | | | |

TYPE[3..0]     Card Type — 0x2 indicates Quad Framer Card 24.
REVISION[3..0]     Revision — indicates revisions which have effect on software. Current revision is 0x1.

-continued

C. 0x200 — LED Control Register (LED): Write only.

| 7 | 6 | 5 | 4 | 3 | 2 | 1 | 0 |
|---|---|---|---|---|---|---|---|
| RED1 | GREEN 1 | RED2 | GREEN 2 | RED3 | GREEN 3 | RED4 | GREEN 4 |

RED[1–4]      Red LED for ports 1 through 4.
GREEN[1–4]   Green LED for ports 1 through 4.

D. 0x800 . . . 0x9FF—Framer #1.
See Brooktree BT-8370 data sheet for details.
E. 0xA00 . . . 0xBFF—Framer #2.
See Brooktree BT-8370 data sheet for details.
F. 0x. . . 0DFF—Framer #3.
See Brooktree BT-8370 data sheet for details.
G. 0xE00 . . . 0xFFF—Framer #4.
See Brooktree BT-8370 data sheet for details.

There are several registers within the framer 80 which need to be set to match the device to the hardware configuration of the quad card 24. These are discussed below.

The quad framer card 24 is designed to have the following clocking features (1) One of the four recovered line clocks (RCKO) from the framers 80 can be selected to be output to the backplane 22 to serve as a master clock for the rest of the system. The other three clocks must be tri-stated by the framers 80 to prevent driving into one another. If none of the clocks serve as the master clock, then all should be tri-stated to reduce system noise. Tri-state of RCKO is controlled by bit 0 of the POE register (019) in the framer 80.

(2) The transmit and receive backplane interfaces are multiplexed at 8.192 MHz to carry all of the PCM traffic to/from the four framers over a single wire for each direction. The backplane timing is GCI, i.e. the clock runs at two times the data rate, data changes on the first rising edge of a bit cell and is sampled on the second falling edge (occurs 0.75 of the way through) of a bit cell.

(3) The transmit LIU is driven by a 1.544 MHz clock which is derived from the 16.384 MHz backplane clock using the framer clock adapter circuit (CLAD). The jitter attenuator is placed in the transmit path.

A hot-swap controller on the +5V input protects the rest of the system from a short on the quad card 24. Bulk decoupling capacitance is provided by two 15-μF capacitors at the point where power comes on the board. A power plane is used to distribute power to components on the card. The +5V plane is evacuated in the high-voltage area of the card to prevent arcing during lightning and leakage testing. A ground plane, which is also evacuated within the high-voltage area, is used to provide a solid ground for the card.

Each of the 32 DS1 (T-1) ports in the connectors 60 and 62 can be allocated to be one of three types—(1) switch, carrying GR-303 voice and management traffic for the device 10 towards a GR-303 switch; (2) drop, carrying combined voice/data/frame relay traffic from a remote customer location to the device 10 from a CSU 34 or CSU/DSU 36; or (3) groom, carrying either voice or data traffic from the device 10 towards a voice or data network resource. Allocation of the T-1 ports of the device 10 is configurable by the system user, providing flexibility on how the traffic is routed from the remote sites to the network facilities. With this flexibility, the user can effectively allocate resources as required based on the traffic utilization patterns of the remote customers.

Central concepts in the architecture of the device 10 include a centralized Time Slot Interchange (TSI), a centralized management system, centralized system clock control, and an 8.192 Mbps system level transport of PCM traffic.

Each controller card 26 and 30 contains the management functions, system clocking control, central TSI capability, protocol processing, and T-1 interface control. The quad framer cards 24 contain protection from lightening on the T-1 transport lines, T-1 transceivers for transmitting and receiving DS1 level signals, T-1 framers to align the serial data contained within the DS1 data stream for access to the DS0 level traffic and signaling information, and clocking and control signals. The backplane 22 transports the framed and multiplexed DS1 level traffic between the controller cards 26 and 30 and the quad framer cards 24 and transfers control and clocking signals between the card types. The connector plane 20 provides the interface between the outside world and the device 10 for DS1 signals, ethernet traffic, RS-232 traffic, alarm information, BITS clocking, and system DC power.

Figure 4A:
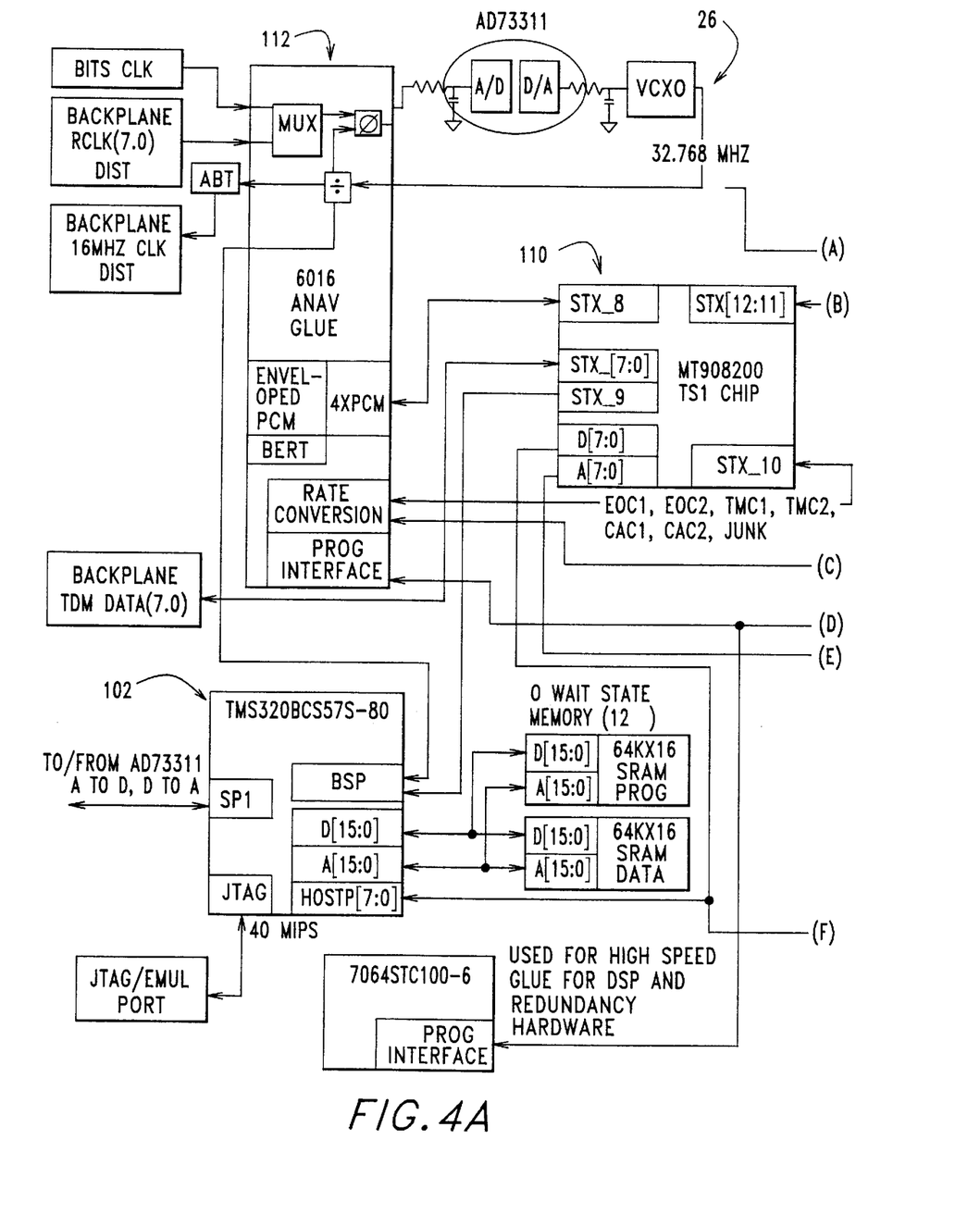
FIGS. 4A and 4B together are a block diagram of the major components of the controller card of the telecommunication device of FIG. 3, with similarly-labeled lines on FIGS. 4A and 4B showing interconnection points.
Figure 4B:
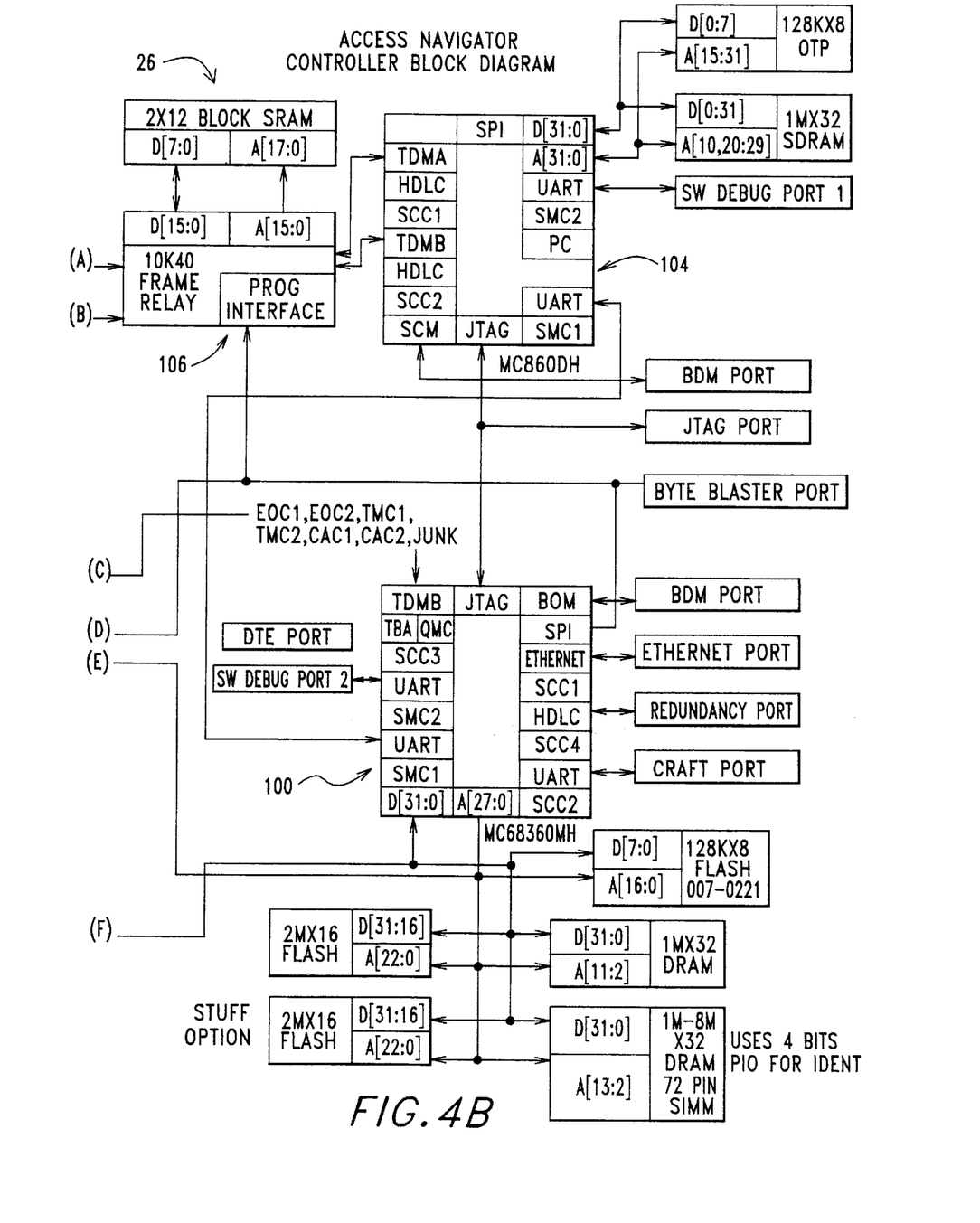

Each controller card 26 and 30 provides the functions necessary to interface with system users and control the operations supported by the device 10. Because the controller cards 26 and 30 are identical, only card 26 will be described in detail. As shown in FIGS. 4A and 4B, the TSI 110 is central to the distribution of information on the controller card 26 and throughout the device 10. Processors on the controller card 26 are allocated to implement the management and protocol functions necessary to support product features and to communicate with the other cards in the system to coordinate configuration and control with user inputs.

The key components of the controller card 26 are: (1) a Master Control Processor 100, such as a MC68360 MH; (2) a Line Interface Engine 102, such as a TMS320BCS57S-80 (Digital Signal Processor (DSP)); (3) an optional Frame Relay Processor 104, such as a MC860DH; (4) an optional Frame Relay HDLC aggregrator 106, including custom algorithms implemented in an Altera 10K40; (5) a Central TSI 110, such as a, MT90820; and (6) an FPGA device 112, such as an Altera 6016.

The Master Control Processor 100 is the main processing resource in the device 10 and it performs management and protocol processing for the core DCS, GR-303 call control, and frame relay configuration features. Communication to system devices is provided through built in serial communication channels. System programs for all processing and programmable devices in the device 10 are supported by the flash connected to this Processor 100 and are downloaded to the appropriate devices at system boot time. A summary of functions provided in the Master Control Processor 100 include:

(1) Management interfaces for a proprietary Command Line Interface (CLI) language. CLI messages are passed over either the RS-232 interface 66 (marked 'Craft Port') with the outside world or the ethernet/telnet interface 70 with the outside world.

(2) Communication with the redundant controller card 30 in the system is provided to allow a non-service interrupting transfer of control if a failure occurs on the active controller card 26. Communication with the redundant processor is achieved via the 'Redundancy Port' connection.

(3) Communication with the Frame Relay Processor 104 occurs over the SMC1 port. Management information necessary to configure and status frame relay parameters is communicated over this port.

(4) Communication with the DSP 102 is supported through a memory mapped Host-Port-Interface (HPI) provided by the DSP 102. Management information necessary to configure and status DS1 parameters, signaling cross-connections, GR-303 hook states, and quad card parameters are passed over this port.

(5) Debug access to the system is provided over the Background Debug Mode ('BDM port') and via the 'SW Debug' SMC2 port. These interfaces are used for development support only.

(6) The Central TSI 110 is used to route GR-303 control channels (Embedded Operations Channel (EOC) and Time-slot Management Channel (TMC)) from the PCM streams to the Master Control Processor 100 using the TDM capabilities of the Processor 100. A simple rate conversion is performed in the FPGA device 112 to convert between the TSI 8.192 Mbps PCM stream and the 2.048 Mbps rate supported by the Master Control Processor 100.

(7) The GR-303 protocol stacks for both EOC and TMC are executed on the Master Control Processor 100. These protocol functions allow the system to handle voice calls per the Bellcore GR-303 specification.

(8) Command processing, event logging, data base maintenance, alarm management, and SNMP agent functions are also implemented in the Master Control Processor 100.

(9) Flash memory is used as a non-volatile store of program information for all system programmable devices and for configuration parameters which are saved through power cycles.

(10) RAM devices are provided to support execution of the core software for the Master Control Processor 100.

The Line Engine Interface (DSP) Processor 102 provides the functions required to: (1) interface the system with the quad framer cards 24; (2) provide signaling bit cross-connections; (3) recognize hook events for GR-303 call control; (4) maintain the system clocking PLL; and (5) generate test tone information for distribution via the central TSI 110.

The FPGA device 112 provides logic cells that can be programmed to support various functions required on the controller card 26. It is used as a logic resource to provide interface functions between other system components. The logic included in this device provides functions to: (1) provide a fractional BERT pattern which can be routed through the TSI 110 to a selected DS1 for testing purposes; (2) provide a rate conversion for the EOC/TMC internal stream between the Master Control Processor 110 and the TSI 110; (3) provide clocking source selection and control signals from the backplane 22 to the internal system clock; and (4) provide registers for signals input from the backplane 22 or output to the backplane 22 (such as alarm inputs, alarm outputs); (5) provide control signals for accessing devices from the Master Control Processor 100.

The Central TSI 110 routes PCM streams through the system and allows the system to: (1) route DS1 level data to internal resources—TMC/EOC data to/from the Master Control Processor 100, and tone information to/from the Line Interface Engine Processor 102; (2) re-route and re-combine incoming DS1 information into a newly configured outgoing DS1, DS0 level routing is controlled by the way the Master Control Processor 100 programs the Central TSI 110; and (3) route frame-relay information to the Frame Relay HDLC aggregator 106 for processing by the Frame Relay Processor 104 and from the Frame Relay HDLC aggregator 106 post-processing.

The central TSI 110 is integral to the architecture of the device 10 as it allows the system processing resources access to any information on the PCM streams. In addition, this routing approach allows information to be passed to and from the quad framer cards 24 using standardized 8.192 Mbps interfaces.

The final two major components on the controller card 26, the Frame Relay HDLC aggregator 106 and the Frame Relay Processor 104, are used to support the system level Frame Relay aggregation capability. The Frame Relay HDLC aggregator 106 is used to transparently pass HDLC information from multiple channels through a single physical channel on the Frame Relay Processor 104. The Frame Relay Processor 104 executes a frame relay protocol processing stack to route the frame information according to user supplied parameters. User configuration and status information for frame relay functions is passed between the Frame Relay Processor 104 and the Master Control Processor 100 over the SMC1 serial port. The BDM and SW Debug ports are used to support development. Memory is used by the Frame Relay Processor 104 for software execution and for data buffering purposes. Memory is used by the Frame Relay HDLC aggregator 106 for buffering purposes.

The device 10 also includes a unique method for sharing information between identical components in a redundant system to ensure uninterrupted operation in the event of a system fault. This method is used in the device 10 to share information between the two controller cards 26 and 30.

To simplify the interface between the active controller card 26 or 30 and the quad framer cards 24, only the active controller card can access the set of quad framer cards 24. When the active controller card fails or is removed, the backup controller card may access the quad framer cards 24.

Figure 5:
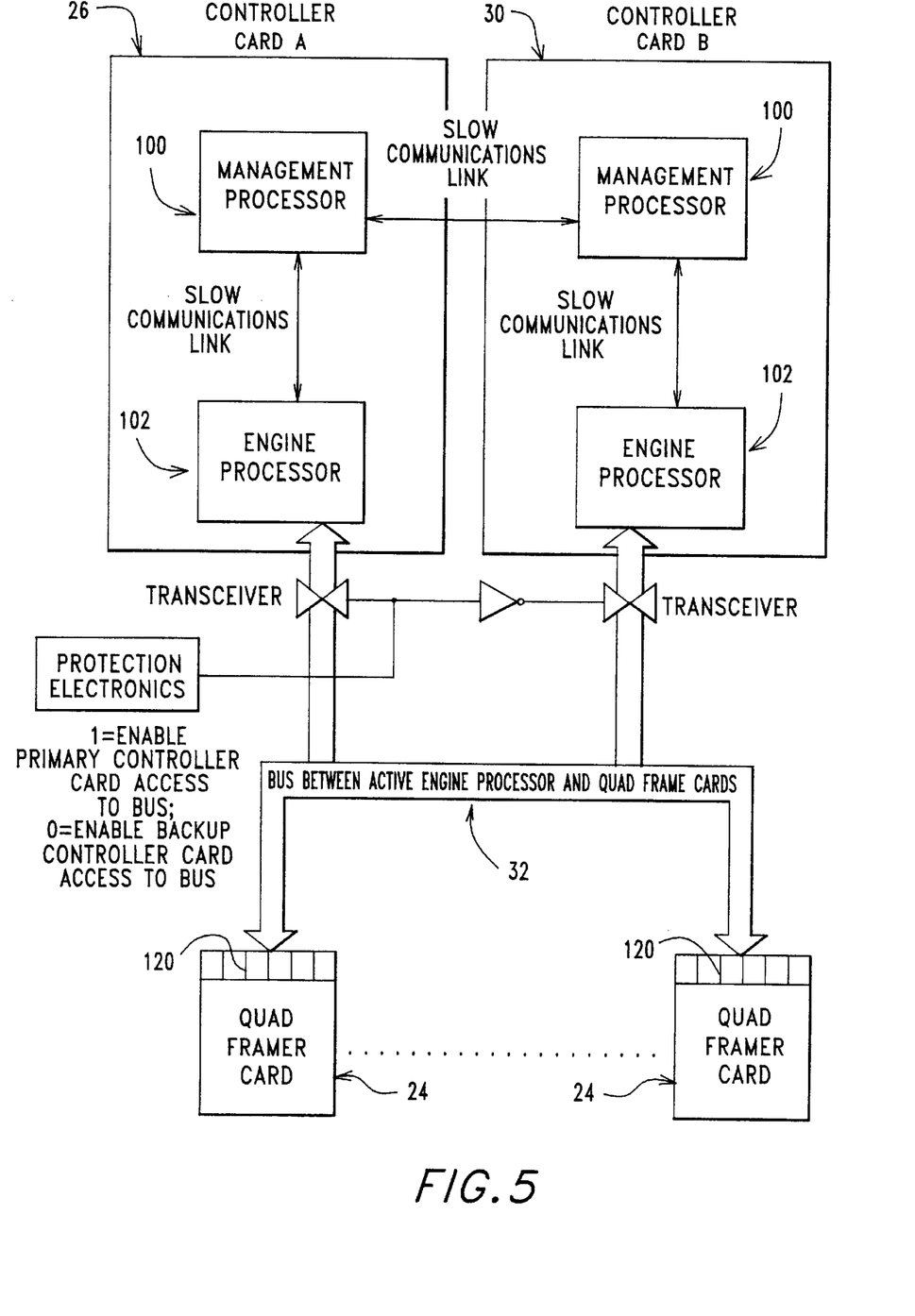
FIG. 5 is a simplified block diagram of the interface between the two controller cards and the quad framer cards of the telecommunication device of FIG. 3.

Each controller card has three CPUs, two of which are shown in FIG. 5, the Master Control Processor 100 that provides a user interface, and the Line Interface Engine Processor 102 that controls the quad framer cards 24.

The Line Interface Engine Processor 102 configures and monitors the quad framer cards 24. The monitoring process runs a state machine to execute specific actions in a sequential fashion.

The two Line Interface Engine Processors communicate with each other via a link between the two Management Processors. To use this link, the active Line Interface Engine Processor sends information to the active Management Processor, which forwards the information to the standby/backup Management Processor, which then forwards the information to the standby/backup Line Interface Engine Processor. Note that there are three separate communications links involved in this information transfer. Each of these links is relatively slow. Since the information travels along the three links one at a time, the time for the complete information transfer between Line Interface Engine Processors is slow.

The Line Interface Engine Processor uses the bus 32 to control the quad framer cards 24. A single set of protection electronics allows only one controller card to access the bus 32. Initially, the active controller card has exclusive access to the bus 32. When a fault occurs on the active controller card, the protection electronics disables access to the bus 32 by the active controller card and enables access to the bus 32 by the standby/backup controller card.

When the standby/backup controller card is not active (i.e. waiting for a fault to occur), it does not have access to the bus 32 that controls the quad framer cards 24. As a result, the Line Interface Engine Processor 102 on the standby/backup controller card has no information about the quad framer cards 24, or even knowledge of their existence.

This architecture presents a problem for the design of the Line Interface Engine Processor 102. In order for the standby/backup controller card to take over operation when a fault occurs, the Line Interface Engine Processor 102 on the standby/backup controller card must know what was happening prior to the fault. Specifically, the standby/backup Line Interface Engine Processor 102 must know the state of the monitoring process that was running on the active Line Interface Engine Processor 102. The monitoring process state changes very rapidly, so any information transfer between the active and standby/backup Line Interface Engine Processors 102 must occur quickly to prevent information loss during the fault.

The solution to this problem is to store the monitoring process state information on the quad framer cards 24, rather than on the active controller card. This way, when the standby/backup controller card assumes control after a fault, all the required information is available because the standby/backup Line Interface Processor 102 has access to the bus 32 used to access the quad framer cards 24.

The data is stored in spare 8-bit buffer registers 120 on each framer. Each framer has fourteen of these spare registers 120, half of which are used for this purpose. The data stored in the registers 120 is historical data about the status and condition of the DS1 signal associated with that particular framer.

Figure 6:
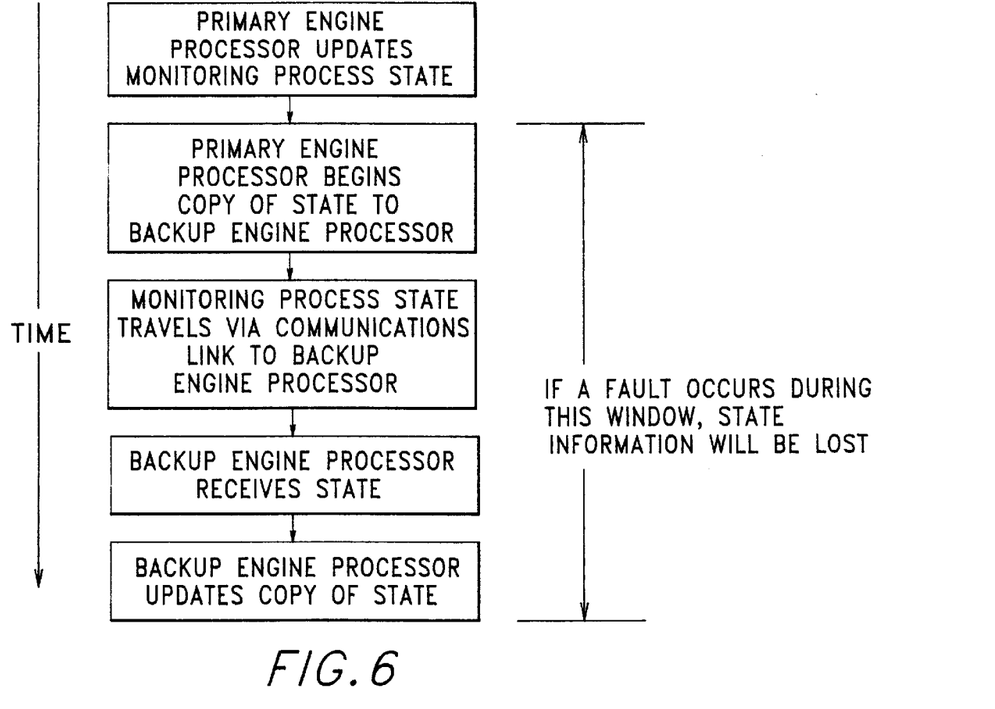
FIG. 6 is a flow diagram showing the timeline of events occurring during one type of data protection algorithm.

Another possible solution to the problem is to copy the monitoring process state information from the active Line Interface Engine Processor 102 to the standby/backup Line Interface Engine Processor 102 as the state changes. However, this solution does not guarantee seamless operation in the event of a fault. For instance, if the information transfer takes a finite amount of time to complete, there exists a window of time where a fault could occur before the standby/backup Line Interface Engine Processor 102 receives the critical information. The diagram in FIG. 6 illustrates this window. In the device 10, this window may be as large as 500 msec due to the time for information to traverse the three links. Such a delay precludes use of this copy method.

Figure 7:
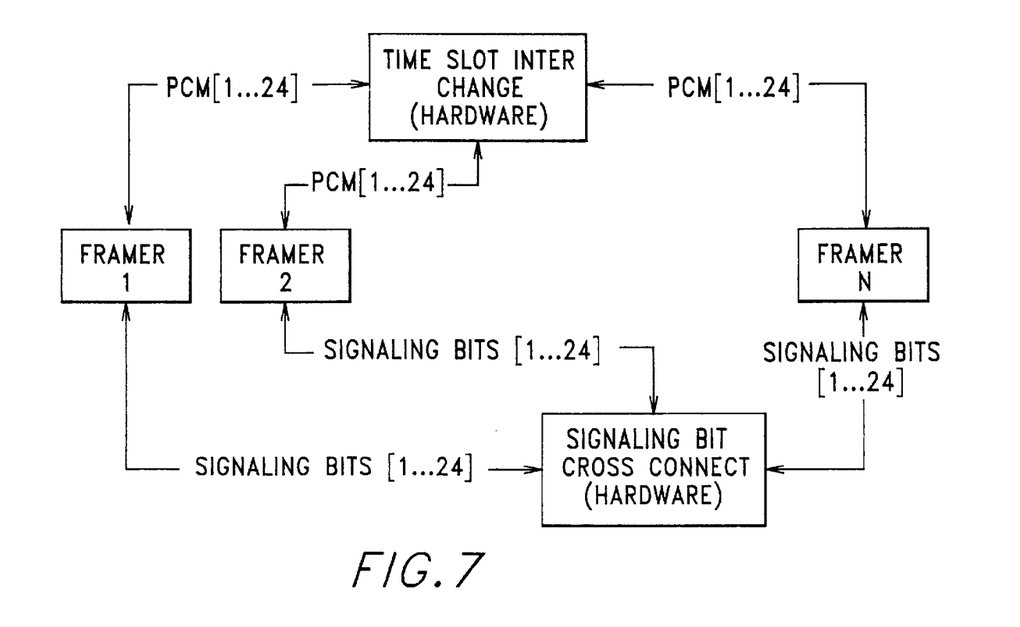
FIG. 7 is a block diagram showing signaling bit cross-connection implemented in hardware.

Another aspect of the present invention relates to cross-connecting robbed bit signaling with software. When cross-connecting DS0 time slots using a Time Slot Interchange (TSI) the signaling bits (the robbed bits) becomes invalid at the destination. This is because the TSI cross-connects (interchanges) DS0s with no knowledge of the T-1 framing bits. For data circuits, since there is no robbed bit signaling, the TSI by itself is sufficient to complete the cross-connect. Voice circuits, however, have robbed bit signaling that requires signaling bits to be re-inserted into the sixth, twelfth, eighteenth, and twenty-fourth frames. In the past this has been typically done with additional hardware on the board, as shown in FIG. 7.

The device 10 of the present invention uses software along with a feature available in most framer chips to re-insert the signaling bits into the appropriate T-1 frames. The prior art hardware solution does not provide mapping of signaling bits to different signaling types, also known as translation of the signaling bits (such as between various protocols like loop start, ground start, or GR-303, the first two of which are two-bit protocols and the latter of which is a four-bit protocol). A software solution was developed to do the signaling bit mapping and translation, as is discussed below.

Figure 8:
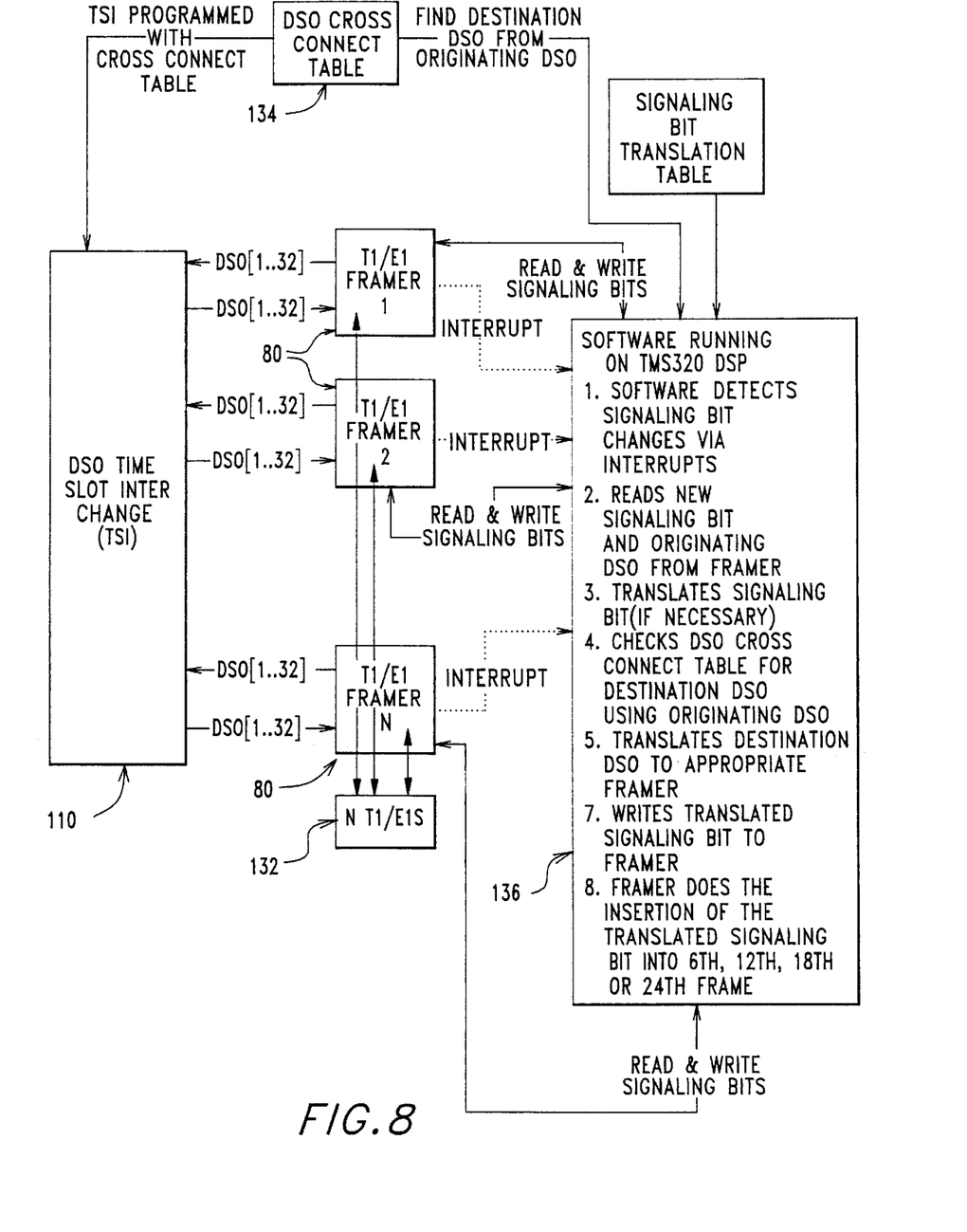
FIG. 8 is a block diagram showing signaling bit translation and cross-connection as implemented in software in the telecommunication device of FIG. 3.

As can be seen in FIG. 8, each of N framers 80 that are distributed across the quad framer cards 24 receive DS1 signals from the T-1 lines 132. The framers 80 provide multiplexed DS0 signals to the TSI 110, which performs the cross-connect function according to a cross-connect table 134 stored in the Line Interface Engine Processor 102. The software 136 for performing the signaling bit cross-connection, which resides in the Line Interface Engine Processor 102, receives an interrupt from a framer 80 whenever a signaling bit changes in an incoming DS0 channel. The software 136 detects this interrupt and reads the new set of signaling bits and the originating DS0 channel from the framer 80. The software 136 then translates this set of signaling bits, if this is necessary. The software 136 then checks the cross-connect table 134 to determine the destination DS0. The software 136 next translates the destination DS0 to the appropriate framer 80 and writes the set of signaling bits to this framer 80. The framer 80 then inserts the set of signaling bits into every sixth, twelfth, eighteenth, and twenty-fourth frame.

Statistical analysis and study of the most likely applications of the device 10 shows that although the signaling bits are updated every 3 ms (for ESF framing) the signaling bits do not change that often. This was true even with 768 (32×24) voice channels, which is the maximum number of phone lines that could be switched by the device 10. Consequently, instead of cross-connecting every 3 ms, the cross-connect can be performed only on a signaling bit change. The software 136 uses the same cross-connect table 134 that is used by the TSI 110. The Line Interface Engine Processor 102 has sufficient software processing power to cross-connect the signaling bits based on signaling bit changes. This solution provides the ability to map signaling bits. Furthermore, it eliminates the signaling bit cross-connect hardware and enables translation of signaling bits to different signaling types.

Advantages

The controller architecture of the device 10 provides key benefits to servicing the voice and data telecommunications access needs of customers serviced by voice and data carrier networks. These advantages include: (1) eliminating costly equipment at the switching centers previously needed to separate the voice and data traffic; (2) simplifying the voice and data access deployment by supporting multiple services in a single product (DCS, GR-303 call control, and frame relay aggregation); (3) enhancing transmission characteristics by eliminating 'hops' through additional equipment in the access network path; and (4) enhancing bandwidth utilization from network switching resources. By breaking traditional boundaries between devices, the architecture of the device 10 provides efficient transport of voice and data traffic from distributed customer locations to centralized carrier facilities.

As to the method of sharing information between redundant components, the invention has a key advantage over the alternative: since the critical information is stored in one place instead of two, there is no delay in copying the information from one location to the other. Therefore, as soon as the active Line Interface Engine Processor 102 stores the information, it is available for use by the standby/backup Line Interface Engine Processor 102 when a fault occurs.

As to the aspect of the invention relating to signaling bit insertion, far less processing resources are used because processing is not required in every frame, but instead only upon the hardware detecting a signaling bit change.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A telecommunication device for interconnecting multiplexed high speed voice and data channels, each multiplexed DS1 high speed voice and data channel carrying a serial stream of digital data bits and having sufficient capacity to carry multiple DS0 voice and data channels, the telecommunication device comprising:
   a backplane receptive of each of the multiplexed DS1 high speed voice and data channels;
   a plurality of framer cards connected to the backplane, each framer card being receptive of N of the multiplexed DS1 high speed voice and data channels, each framer card segmenting the serial stream of digital data bits into frames of data and multiplexing the N DS1 channels to a rate of at least N times DS1, with this multiplexed signal provided as an output from the framer cards;
   a primary controller card connected to the backplane and receptive of the frames of data from each of the framer cards in the multiplexed signal, the controller card performing a time slot interchange on various ones of the DS0 channels in the multiplexed DS1 high speed voice and data channels; and
   a redundant controller card connected to the backplane and receptive of the frames of data from each of the framer cards in the multiplexed signal, the controller card performing a time slot interchange on various ones of the DS0 channels in the multiplexed DS1 high speed voice and data channels;
   wherein each of the controller cards include logic therein to determine which of the primary and redundant controller cards are active to perform the time slot interchange and which of the controller cards are in standby.

2. A telecommunication device as defined in claim 1, wherein the active one of the primary and redundant controller cards also perform a concentration of the DS0 channels into DS1 channels.

3. A telecommunication device as defined in claim 2, wherein the concentration is performed according to GR-303 protocol.

4. A telecommunication device as defined in claim 1, wherein each of the plurality of framer cards include four framers, one for each of the four DS1 channels to which each framer card is receptive.

5. A telecommunication device as defined in claim 1, wherein the framer cards multiplexed signal output therefrom is at a rate of at least 8.192 Mbps.

6. A telecommunication device as defined in claim 1, wherein the active one of the primary and redundant controller cards monitor the status of the DS1 channel associated with each framer and generate historical data about the status of the DS1 channel and store the historical data in spare registers within the corresponding framer, and wherein upon a transition between the two controllers, the controller that has just become active can read the historical data from each framer to understand the status of the DS1 channel associated with each framer.

7. A telecommunication device as defined in claim 1, wherein the active controller card includes a processor thereon with software that performs a digital cross-connect of signaling bits in the DS0 channels.

8. A telecommunication device as defined in claim 7, wherein the software in the processor only performs the digital cross-connect of signaling bits on every change in the respective signaling bit.

9. A telecommunication device as defined in claim 7, wherein the processor also translates signaling bits to different signaling types.

10. A telecommunication device, comprising:
    a housing having outer dimensions configured to fit in a standard telecommunication bay and consuming no more than two rack units;
    a 1/0 digital cross-connect switch located within the housing and utilizing one of at least two redundant controllers, each of the redundant controllers having at least one processor thereon;
    a concentrator located within the housing utilizing the one of the redundant controllers and the at least one processor thereon; and
    a frame relay aggregation switch located within the housing utilizing the one of the redundant controllers and the at least one processor thereon.

11. A telecommunications device as defined in claim 10, further including a central bus accessible by the one of the redundant controllers, the cross-connect-switch, the concentrator, and the frame relay aggregation switch.

12. A telecommunication device for interconnecting multiplexed high speed voice and data channels, each multiplexed DS1 high speed voice and data channel carrying a serial stream of digital data bits and having sufficient capacity to carry multiple DS0 voice and data channels, the telecommunication device comprising:
    a backplane receptive of each of the multiplexed DS1 high speed voice and data channels;
    a plurality of framer cards connected to the backplane, each framer card being receptive of a plurality of the multiplexed DS1 high speed voice and data channels, each framer card segmenting the serial stream of digital data bits into frames of data;
    a primary controller card connected to the backplane and receptive of the frames of data from each of the framer cards, the controller card performing a time slot interchange on various ones of the DS0 channels in the multiplexed DS1 high speed voice and data channels; and
    a redundant controller card connected to the backplane and receptive of the frames of data from each of the framer cards, the controller card performing a time slot interchange on various ones of the DS0 channels in the multiplexed DS1 high speed voice and data channels;
    wherein each of the controller cards include logic therein to determine which of the primary and redundant controller cards are active to perform the time slot interchange and which of the controller cards are in standby;

wherein the active one of the primary and redundant controller cards monitor the status of the DS1 channel associated with each framer and generate historical data about the status of the DS1 channel and store the historical data in spare registers within the corresponding framer, and wherein upon a transition between the two controllers, the controller that has just become active can read the historical data from each framer to understand the status of the DS1 channel associated with each framer.

13. A telecommunication device for interconnecting multiplexed high speed voice and data channels, each multiplexed DS1 high speed voice and data channel carrying a serial stream of digital data bits and having sufficient capacity to carry multiple DS0 voice and data channels, the telecommunication device comprising:

a backplane receptive of each of the multiplexed DS1 high speed voice and data channels;

a plurality of framer cards connected to the backplane, each framer card being receptive of a plurality of the multiplexed DS1 high speed voice and data channels, each framer card segmenting the serial stream of digital data bits into frames of data;

a primary controller card connected to the backplane and receptive of the frames of data from each of the framer cards, the controller card performing a time slot interchange on various ones of the DS0 channels in the multiplexed DS1 high speed voice and data channels; and a redundant controller card connected to the backplane and receptive of the frames of data from each of the framer cards, the controller card performing a time slot interchange on various ones of the DS0 channels in the multiplexed DS1 high speed voice and data channels;

wherein each of the controller cards include logic therein to determine which of the primary and redundant controller cards are active to perform the time slot interchange and which of the controller cards are in standby;

wherein the active controller card includes a processor thereon with software that performs a digital cross-connect of signaling bits in the DS0 channels only upon receiving an interrupt signal indicating that the respective signaling bits have changed.

14. A telecommunication device as defined in claim 13, wherein the processor also translates signaling bits to different signaling types.

15. A telecommunication device for interconnecting multiplexed high speed voice and data channels, each multiplexed DS1 high speed voice and data channel carrying a serial stream of digital data bits and having sufficient capacity to carry multiple DS0 voice and data channels, the telecommunication device comprising:

a backplane receptive of each of the multiplexed DS1 high speed voice and data channels;

a plurality of framer cards connected to the backplane, each framer card being receptive of a plurality of the multiplexed DS1 high speed voice and data channels, each framer card segmenting the serial stream of digital data bits into frames of data;

a primary controller card connected to the backplane and receptive of the frames of data from each of the framer cards, the controller card performing a time slot interchange on various ones of the DS0 channels in the multiplexed DS1 high speed voice and data channels; and a redundant controller card connected to the backplane and receptive of the frames of data from each of the framer cards, the controller card performing a time slot interchange on various ones of the DS0 channels in the multiplexed DS1 high speed voice and data channels, wherein each of the controller cards include logic therein to determine which of the primary and redundant controller cards are active to perform the time slot interchange and which of the controller cards are in standby;

wherein the active one of the primary and redundant controller cards monitor the status of the DS1 channel associated with each framer and generate historical data about the status of the DS1 channel and store the historical data in spare registers within the corresponding framer, and wherein upon a transition between the two controllers, the controller that has just become active can read the historical data from each framer to understand the status of the DS1 channel associated with each framer;

wherein the active controller card includes a processor thereon with software that performs a digital cross-connect of signaling bits in the DS0 channels only upon receiving an interrupt signal indicating that the respective signaling bits have changed.

16. A method for passing data within a telecommunication device from a primary and active circuit initially controlling the device to a redundant circuit that can assume control of the device and become active upon the removal or failure of the primary circuit, the device having a plurality of input circuits receptive of a plurality of input signals, the method comprising:

generating data in the primary circuit about the input circuits and the input signals;

passing the data about the input circuits and input signals from the primary circuit to the respective input circuits;

determining that the redundant circuit is to assume control of the device;

transitioning control of the device to the redundant and newly-active circuit; and passing the data about the input circuits and input signals from the respective input circuits to the redundant and newly-active circuit.

* * * * *